US012566840B2

(12) United States Patent
Grobelny et al.

(10) Patent No.: US 12,566,840 B2
(45) Date of Patent: Mar. 3, 2026

(54) SYSTEMS AND METHODS FOR CREATING TRUSTWORTHY ORCHESTRATION INSTRUCTIONS WITHIN A CONTAINERIZED COMPUTING ENVIRONMENT FOR VALIDATION WITHIN AN ALTERNATE COMPUTING ENVIRONMENT

(71) Applicant: DELL PRODUCTS L.P., Round Rock, TX (US)

(72) Inventors: Nicholas D. Grobelny, Evergreen, CO (US); Sumanth Vidyadhara, Bangalore (IN); Richard M. Tonry, Georgetown, TX (US); Amy C. Nelson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 237 days.

(21) Appl. No.: 17/875,067

(22) Filed: Jul. 27, 2022

(65) Prior Publication Data

US 2024/0037216 A1 Feb. 1, 2024

(51) Int. Cl.
| | |
|---|---|
| *G06F 21/53* | (2013.01) |
| *G06F 21/57* | (2013.01) |
| *H04L 9/32* | (2006.01) |

(52) U.S. Cl.
CPC ............ *G06F 21/53* (2013.01); *G06F 21/572* (2013.01); *H04L 9/3247* (2013.01); *H04L 9/3268* (2013.01); *G06F 2221/033* (2013.01)

(58) Field of Classification Search
CPC .... G06F 21/53; G06F 21/572; G06F 2221/03; H04L 9/3247; H04L 9/3268
See application file for complete search history.

(56) References Cited

U.S. PATENT DOCUMENTS

2015/0264021 A1* 9/2015 Schulz ................ H04L 63/0414
713/170

OTHER PUBLICATIONS

Intel, Intel Trusted Execution Technology (Intel TXT) Overview, Mar. 2018, 1 pg.
Wikipedia, Containerization (Computing), Obtained From Internet Jul. 7, 2022, 3 pgs.

(Continued)

*Primary Examiner* — Zachary A. Davis
(74) *Attorney, Agent, or Firm* — Egan, Enders & Huston LLP.

(57) ABSTRACT

Systems and methods are provided that may be implemented to provide a basic input/output system (BIOS) with the ability to authenticate and then execute one-time unique instructions that are previously left behind (i.e., stored) in public memory of an information handling system by a containerized computing environment session that is no longer executing on the information handling system. The disclosed systems and methods may be so implemented to share with the system BIOS privileged instructions to identify which executables are authorized for execution on a targeted information handling system. The privileged instructions may be previously created and optionally stored together with an executable code in system public memory, and these instructions may provide instructions on how to execute the executable code.

25 Claims, 4 Drawing Sheets

(56) References Cited

OTHER PUBLICATIONS

Microsoft, "NET Microservices: Architecture For Containerized .NET Applications", Obtained From Internet Jul. 7, 2022, 349 pgs.
Intel, "Solution Providers With Intel", Obtained from Internet Jul. 7, 2022, 3 pgs.
Azure, "What is A Container?", Obtained From Internet Jul. 7, 2022, 13 pgs.
Microsoft, "Secure Boot", May 2022, 5 pgs.
Intel, "Intel Trusted Execution Technology (Intel TXT) Enabling Guide", Mar. 2014, 32 pgs.
Dell Technologies, "Using BIOSConnect To Recover SupportAssist OS Recovery Partition", Obtained from Internet Jul. 10, 2022, 5 pgs.
Dell, "Using BIOSConnect To Recover Support Assist OS Recovery Partition", Obtained From Internet Apr. 2020, 5 pgs.
Low et al, "Systems And Methods To Orchestrate Trusted Enrollment", U.S. Appl. No. 17/458,088, filed Aug. 26, 2021, 34 pgs.

* cited by examiner

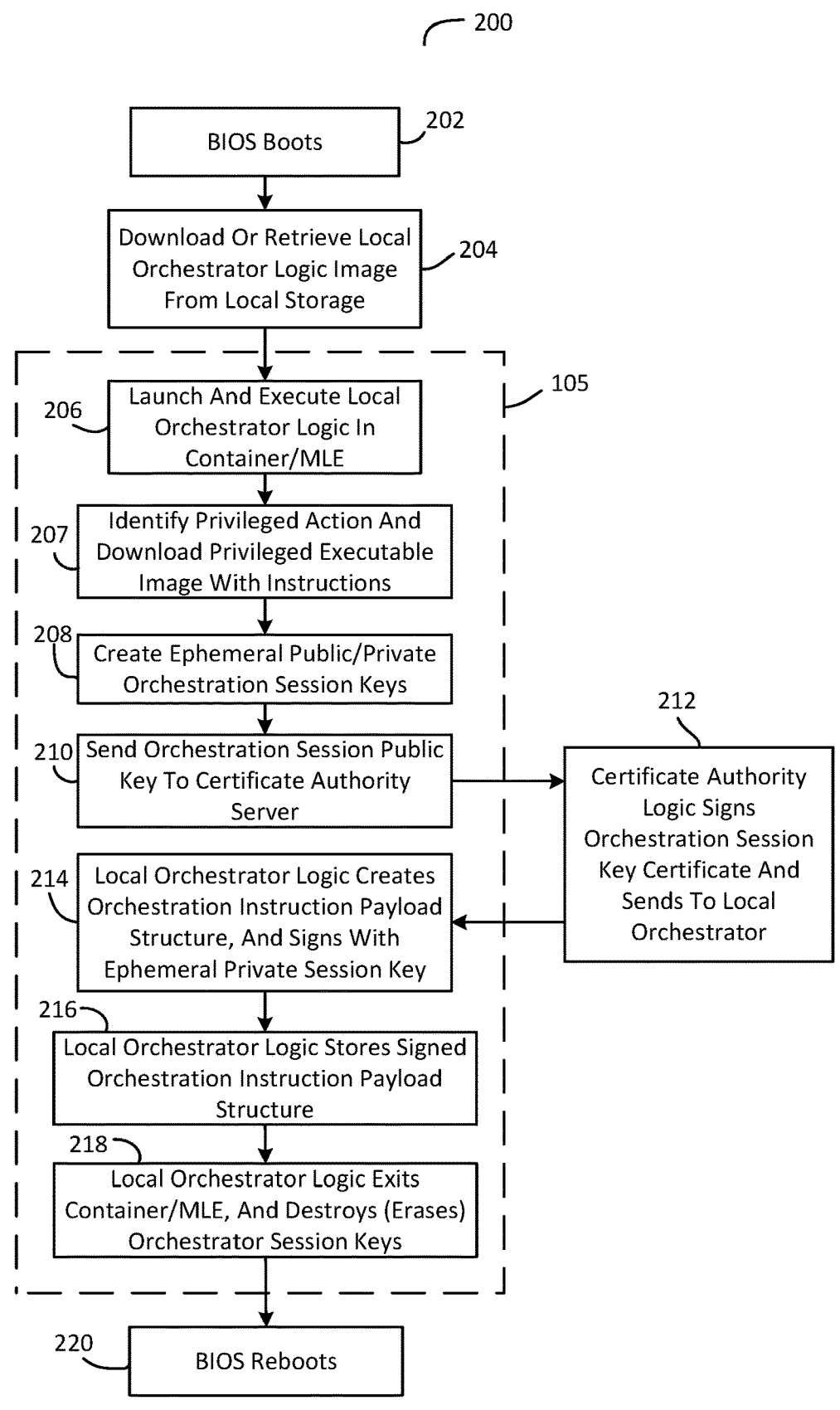

200

BIOS Boots ⟋202

Download Or Retrieve Local Orchestrator Logic Image From Local Storage ⟋204

105

206 Launch And Execute Local Orchestrator Logic In Container/MLE

207 Identify Privileged Action And Download Privileged Executable Image With Instructions 208 Create Ephemeral Public/Private Orchestration Session Keys 210 Send Orchestration Session Public Key To Certificate Authority Server 212 Certificate Authority Logic Signs Orchestration Session Key Certificate And Sends To Local Orchestrator 214 Local Orchestrator Logic Creates Orchestration Instruction Payload Structure, And Signs With Ephemeral Private Session Key 216 Local Orchestrator Logic Stores Signed Orchestration Instruction Payload Structure 218 Local Orchestrator Logic Exits Container/MLE, And Destroys (Erases) Orchestrator Session Keys 220 BIOS Reboots

*FIG. 2*

SYSTEMS AND METHODS FOR CREATING TRUSTWORTHY ORCHESTRATION INSTRUCTIONS WITHIN A CONTAINERIZED COMPUTING ENVIRONMENT FOR VALIDATION WITHIN AN ALTERNATE COMPUTING ENVIRONMENT

FIELD

This application relates to information handling systems and, more particularly, to orchestration instructions created on an information handling system during a containerized computing environment.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Software containers are used to package code for a software application or service together with its dependencies as a container image. In some cases, such a container can run on a container host that itself runs on a host operating system of an information handling system, and the container isolates its application or service from other code executing on the same operating system.

Intel Trusted Execution Technology (TXT) is available from Intel Corporation of Santa Clara, California, and provides a hardware basis for validating integrity of information handling system components (operating system (OS) loader, basic input/output system (BIOS), and hypervisor) at each launch of a protected secure environment on the information handling system by validating that that there have been no unauthorized changes to code that is used to provide the secure environment. Intel Measured Launch Environment (MLE) is available from Intel Corporation of Santa Clara, California, and uses TXT to launch a secure environment and to protect secrets within the secure environment. The MLE executes a Trusted Boot (tboot) code prior to launch of the OS, during which the system BIOS measures and verifies system code of the information handling system prior to bringing the information handling system into a secure and protected operating state.

Techniques for one-time operations are known that may use monotonic counters or nonces on information handling systems.

SUMMARY OF THE INVENTION

Disclosed herein are systems and methods that may be implemented to provide a basic input/output system (BIOS) with the ability to authenticate and then execute one-time unique instructions that are previously left behind (i.e., stored) in public memory of an information handling system by a containerized computing environment session (e.g., such as a local orchestrator running in the context of an Intel Measured Launch Environment (MLE) or other type of container) that is no longer executing on the information handling system. The disclosed systems and methods may be so implemented in one embodiment to provide a way (e.g., from within a containerized computing environment such as an MLE) to share with the system BIOS exact and explicit privileged instructions to identify which executables are authorized for execution on a targeted information handling system for a limited session duration, e.g., to prevent unintentional execution of the privileged executable and such that the privileged instructions cannot be replayed across unauthorized subsequent boot sequences, or copied over to alternate, unauthorized systems. In one embodiment, the instructions may be previously created and optionally stored together with an executable code (e.g., executable container, instruction sequence, script, etc.) in system public memory, and the instructions may provide instructions on how to execute (e.g., how to boot) the executable code.

In one embodiment, the disclosed systems and methods may be implemented to provide the information handling system BIOS with the ability when it boots to authenticate instructions previously stored by a containerized computing environment on the information handling system. In this way, the system BIOS may be enabled to verify that the instructions are fresh, recent, and/or authorized by an original equipment manufacturer (OEM) or other authorized supplier of authentic code to be executed by the information handling system, without existence of a direct line of communication between the current BIOS boot session and the previous (but now closed) session of the containerized computing environment session that stored the instructions in public memory on the information handling system. In this way, the information handling system BIOS may verify on system reboot that instructions of the previously-stored executable container have not been compromised (e.g., altered) by a threat actor, before implementing the instructions to execute an executable code on the information handling system.

In one embodiment, the disclosed systems and methods may be implemented to allow the information handling system BIOS to detect whether a threat actor has altered previously-stored instructions by replacing an identity of an executable code image originally identified by the instructions with a second and different executable code image that was not originally identified by the instructions when stored on the information handling system by the containerized computing environment, and to prevent execution of the non-intended second executable code image. In this regard, a selected executable code (e.g., such as a container) may be stored in public memory of an information handling system by a previous (and now closed) containerized computing environment session. This selected executable code may be signed by an OEM or other authorized code provider, and may have (or include) a given set of custom privilege/s to perform diagnostics or configuration changes on the information handling system that would not otherwise be possible during a normal system boot and normal system operation. Although this selected executable code image may also be protected with Secure Boot, a threat actor may replace its identity in the instructions with the identity of a different one of many other Secure Boot code images (e.g., having additional and different privileges than the selected executable code) that may also be present on the information handling system. If the substitution of this different Secure Boot image in the instructions goes undetected and if this different Secure Boot image is subsequently executed, it may be used to allow the threat actor to effectively manipulate the information handling system to perform additional privileged workflows that the containerized computing environment did not intend to invoke, e.g., possibly resulting in unintended system behavior.

Thus, the disclosed systems and methods may be advantageously implemented to detect substitution of the identity of an unintended executable code image (e.g., Secure Boot image) into the instructions left behind by a containerized computing environment, and to prevent execution of such a substituted executable code image that would otherwise allow a threat actor to effectively manipulate the information handling system to perform additional unauthorized privileged workflows (e.g., such as diagnostics or configuration changes) that the original containerized computing environment did not intend to invoke, and which could result in unintended system behavior, such as unintended diagnostics or configuration changes. Therefore, the disclosed systems and methods may be implemented to limit custom and/or additional privileges to those originally intended and authorized by a containerized computing environment that created an executable container, and thus reduce risk of such privileges from being exploited or manipulated by unauthorized entities.

The disclosed systems and methods may be implemented in one embodiment using a containerized computing environment acting as a local orchestrator that executes code and secrets (e.g., such as passwords, user credentials, private keys for sequence, other keys such as wireless keys, etc.) within an isolated container on system public memory, and that leaves an executable code image and instructions for the BIOS on how to execute (e.g., how to boot) the stored executable image on the information handling system. The local orchestrator may utilize a Measured Launch Environment (MLE) such as Intel's TXT, and the TXT MLE may employ tboot to protect code and secrets running within the local orchestrator container. The executable code image and instructions stored in the public memory may then be later accessible by system basic input/output system (BIOS) upon reboot of the information handling system. In one embodiment, the local orchestrator may utilize dynamic root of trust for measurement (DRTM) together with MLE to protect local orchestration, while limiting the scope of those actions with a nonce- or monotonic-count ephemeral key endorsed by an external authorization entity such as certificate authority (CA). In such an embodiment, monotonic counter and/or nonces may be advantageously combined with ephemeral certificate-based public key infrastructure (PKI) orchestration. Advantages that may be realized with this approach include, but are not limited to, protection of many different workflows (e.g., workflows for service, diagnostics, zero-touch deployment, in-field ownership transfer, and many other solutions) from spoofing, tampering, and fraud.

In one respect, disclosed herein is a method, including: executing a containerized computing environment on a first information handling system to: create a data payload structure within the containerized computing environment, the data payload structure including payload contents that include instructions and at least one executable image, and then store the data payload structure in a memory of the first information handling system. The method may further include then exiting the containerized computing environment on the first information handling system without executing the instructions and the at least one executable image.

In another respect, disclosed herein is a system, including a first information handling system that includes at least one programmable integrated circuit programmed to execute a containerized computing environment on a first information handling system to: create a data payload structure within the containerized computing environment, the data payload structure including payload contents that include instructions and at least one executable image, and then store the data payload structure in a memory of the first information handling system. The programmable integrated circuit of the first information handling system may be further programmed to then exit the containerized computing environment on the first information handling system without executing the instructions and the at least one executable image.

In another respect, disclosed herein is a method, including: booting a system basic input/output system (BIOS) to a computing environment on an information handling system that is outside and different from a previously-executed containerized computing environment on the information handling system; executing the booted system BIOS to retrieve each of existing instructions and at least one existing executable image from payload contents of an existing data payload structure previously stored in memory of the information handling system during the previously-executed containerized computing environment; and then executing the retrieved instructions and the retrieved at least one executable image to perform one or more actions on the information handling system that are specified by the retrieved instructions.

BRIEF DESCRIPTION OF THE DRAWINGS

FIG. 2 illustrates methodology according to one exemplary embodiment of the disclosed systems and methods.

DESCRIPTION OF ILLUSTRATIVE EMBODIMENTS

Figure 1:
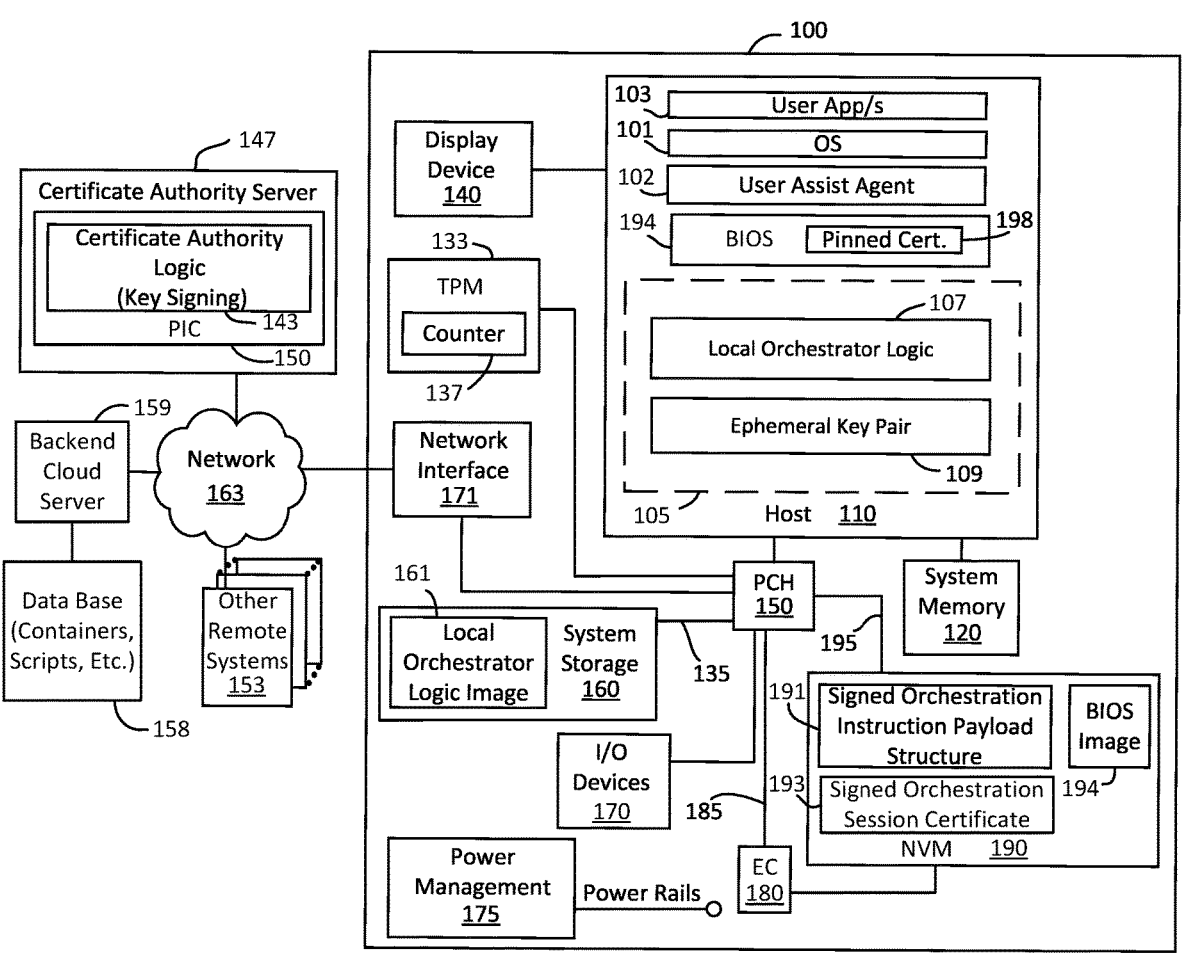
FIG. 1 illustrates a block diagram of an network environment according to one exemplary embodiment of the disclosed systems and methods.

FIG. 1 is a block diagram of an information handling system 100 (e.g., a local information handling system such as a server, desktop computer, laptop computer, tablet computer, etc.) as it may be coupled via a network 163 to other network components of a network environment according to one embodiment of the disclosed systems and methods. In this regard, it should be understood that the configuration of FIG. 1 is exemplary only, and that the disclosed methods may be implemented on other types of information handling systems and network environments. It should be further understood that while certain components of an information handling system and a network environment are shown in FIG. 1 for illustrating embodiments of the disclosed systems and methods, the information handling system and/or network environment components are not restricted to including only those components shown in FIG. 1 and described below.

As shown in FIG. 1, information handling system 100 may include a host programmable integrated circuit 110 which may include any type of processing device, such as an Intel central processing unit (CPU), an Advanced Micro Devices (AMD) CPU or another programmable integrated circuit. Host programmable integrated circuit 110 is coupled as shown to system memory 120, which may include, for example, random access memory (RAM), dynamic RAM (DRAM), synchronous DRAM (SDRAM), etc. In the embodiment of FIG. 1, host programmable integrated circuit 110 may be configured to access system non-volatile memory 190 (e.g., serial peripheral interface (SPI) Flash memory) to load and boot part of a system BIOS 194 (e.g., which may be a unified extensible firmware interface "UEFI" BIOS or other system BIOS, etc.), etc. In one embodiment, information handling system 100 may be coupled by network 163 (e.g., such as the Internet) to other information handling systems 153, backend cloud server 159 and database 158 (e.g., operated by an OEM or other authorized code provider) that contains a repository/domain of executable images and their instructions, and a certificate authority server 147 that is a remote information handling system to information handling system 100 and that includes at least one programmable integrated circuit 150 that executes certificate authority (key signing) logic 143. In one embodiment, each of information handling systems 153, backend cloud server 159 and certificate authority server 147 may be configured as an information handling system including, among other things, one or more of the hardware, software and/or firmware components (e.g., including storage/memory and programmable integrated circuit/s) similar to information handling system 100.

In FIG. 1, host programmable integrated circuit is configured to execute an operating system (OS) 101 (e.g., proprietary OS such as Microsoft Windows 10, open source OS such as Linux OS, etc.), BIOS 194 for system 100 and user assistance agent 102, as well as user software applications 103. Examples of user software applications 103 include, for example, locally-executing applications such as word processing applications, email applications, messaging applications, Internet browsers, computer games, PDF viewers, spreadsheet applications, etc. User assistance agent 102 (e.g., such as the Dell SupportAssist application available from Dell Technologies, Inc. of Round Rock, Texas) performs OS-related tasks such as providing the system end user with access to data and/or automatically performs OS recovery tasks when OS 101 is damaged. User assistance agent 102 may be part of a manufacturer or vendor-supplied OEM software image that includes an original OEM OS and that is shipped with system 100 to the end user.

Also executing on host programmable integrated circuit 110 in FIG. 1 is a secure containerized computing environment 105, such as an Intel Measured Launch Environment (MLE) available from Intel Corporation of Santa Clara, California, and which uses Intel Trusted Execution Technology (TXT) to launch a secure environment and to protect secrets within the secure environment 105. In the example where containerized computing environment 105 is a MLE, the MLE may execute a Trusted Boot (tboot) code prior to launch of the OS 101, during which the system BIOS 194 measures and verifies system code of the information handling system 100 prior to bringing the information handling system 100 into a secure and protected operating state.

In one embodiment, containerized computing environment 105 may implement a local orchestrator session running in the context of an Intel Measured Launch Environment (MLE). In such an embodiment, containerized computing environment 105 may access and load local orchestrator logic image 161 from system storage 160. Local orchestrator logic 161 may be an ephemeral operating system or software environment, e.g., such as a bootloader, an operating system and application logic configured to perform orchestration tasks such as designated privileged and/or sensitive actions. Containerized computing environment 105 may execute local orchestrator logic 107 that is included in local orchestrator logic image 161, and may also execute to create ephemeral session key pair 109 as described further herein.

In the embodiment of FIG. 1, host programmable integrated circuit 110 may be coupled to an external or internal (integrated) display device 140 (e.g., LCD or LED display device or other suitable display device) of system 100. In such an embodiment, integrated graphics capability may be implemented by host programmable integrated circuit 110 to provide visual images (e.g., a graphical user interface, static images and/or dynamic content such as video images) to display device 140 for display to a system user. It will be understood that in other embodiments a separate programmable integrated circuit (e.g., such as graphics processor unit "GPU") may be coupled between host programmable integrated circuit 110 and display device 140 to provide graphics capability for information handling system 100.

In the embodiment of FIG. 1, a platform controller hub (PCH) 150 of information handling system 100 controls certain data paths and manages information flow between components of the information handling system 100. As such, PCH 150 may include one or more integrated controllers or interfaces for controlling data paths connecting PCH 150 with host programmable integrated circuit 110, system storage 160, input/output (I/O) devices 170, network interface (I/F) device 171, out-of-band programmable integrated circuit in the form of an embedded controller 180, and system NVM 190 storing logic components such as BIOS firmware image and settings for BIOS 194, ACPI firmware, etc. In one embodiment, system NVM 190 may also store a data payload structure in the form of an instruction payload structure 191 as described further herein.

In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

As shown in FIG. 1, external and/or internal (integrated) I/O devices 170 (e.g., a keyboard, mouse, touchpad, touchscreen, etc.) may be coupled to PCH 150 of system 100 to enable a local human user to input data to, and otherwise interact with, information handling system 100, and to interact with application programs or other software/firmware executing on host programmable integrated circuit 110. The network I/F device 171 enables wired and/or wireless communication with other systems 153, 159 and 147 of FIG.

1 via network 163 (e.g., the Internet). In one embodiment, network I/F device 171 may be a network interface controller (NIC) which may communicate with external network 163 across an optional intervening internal or local area network (LAN), and/or possibly across other networks such as wireless LAN (WLAN), cellular network, etc. It will be understood that one or more of the other network components of FIG. 1 (e.g., certificate authority server 147, backend cloud server 159 and other information handling systems 153) may be configured in one embodiment with one or more similar components and similar system architecture as information handling system 100.

In FIG. 1, local system storage 160 of information handling system 100 may include one or more media drives, such as hard disk drives (HDDs), optical drives, NVRAM, Flash memory, solid state drives (SSDs), or any other suitable form of internal or external storage that is coupled via data bus (e.g., PCIe bus. SATA bus, etc.) 135 through PCH 150 to provide non-volatile storage media for information handling system 100. A power source for information handling system 100 may be provided via an external power source (e.g., mains power) and an internal power supply regulator, and/or by an internal power source, such as a battery. As shown in FIG. 1, power management system 175 may be included within information handling system 100 for moderating the available power from the power source. In one embodiment, power management system 175 may be coupled to provide operating voltages on one or more power rails to various power-consuming components of information handling system 100, as well as to perform other power-related administrative tasks of the information handling system.

As shown in FIG. 1, out-of-band programmable integrated circuit 180 of information handling system 100 may be an embedded controller (EC) that is coupled to PCH 150 and which may be programmed to execute program instructions to boot information handling system 100, load application firmware from NVM 190 into internal memory, etc. Out-of-band programmable integrated circuit 180 may be, for example, a controller, microcontroller, microprocessor, ASIC, etc., or as a programmable logic device "PLD" such as FPGA, complex programmable logic device "CPLD", etc. Besides an embedded controller, other examples of out-band-programmable integrated circuits include, but are not limited to, baseboard management controller "BMC", service processor, embedded processor, remote access controller, etc. In this regard, an out-of-band programmable integrated circuit 180 is separate and independent from in-band host programmable integrated circuit 110 that runs the host OS 101 of the information handling system 100, and that executes without management of any application executing with the host OS 101 on the host programmable integrated circuit 110.

As shown in the exemplary embodiment of FIG. 1, EC 180 is coupled to PCH 150 within information handling system 100 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195, and various interface and logic blocks included within the PCH 150.

Information handling system 100 may also include a trusted platform module (TPM) 133 coupled to host programmable integrated circuit 110 and other components of system 100 by PCH 150. As shown, TPM may implement a counter 137 as described further herein.

FIG. 2 illustrates methodology 200 that may be implemented on an information handling system 100 according to one exemplary embodiment of the disclosed systems and methods. As shown, methodology 200 begins in block 202 where the system BIOS 194 boots into a containerized computing environment, e.g., such as a MLE. In block 204, BIOS 194 retrieves logic for executing a containerized computing environment in the form of local orchestrator logic image 161, e.g., retrieved from system storage 160 or other non-volatile memory of information handling system. In an alternative embodiment, a local orchestrator logic image 161 may be downloaded by BIOS 194 in block 204 from backend cloud server 159, e.g., via loaded user assistance agent 102.

Next, block 206, local orchestrator logic 107 boots from local orchestrator logic image 161 within the context of container 105 (e.g., a TXT MLE) in order to protect any derived ephemeral derived ephemeral secrets stored in a volatile system memory 120 or other types of container security employed. Once booted, local orchestrator logic 107 executes within container 105 in block 207 to determine and identify a specific identified custom privileged action (e.g., such as system hardware diagnostics, system software diagnostics, system memory scanning, booting to another and separate computing environment and/or operating system, BIOS attribute changes, change or creation of specific layout of OS images in RamDisk format, booting to system OS 101 to run a privileged (e.g., non-normal) operation, etc.) that needs to be performed, e.g., based on authenticated information stored in memory by ephemeral keys or one time keys used to authenticate the BIOS attributes or RamDisk layout in memory using these keys, etc. Also in block 207, local orchestrator logic 107 then requests and downloads via cloud server 159 a signed (e.g., generic, secure boot ready) privileged executable image 310 and/or 313 and BIOS instructions 312 (e.g., container, OS, scripts, etc.) corresponding to the identified specific custom privileged action from the repository/domain of database 158.

Figure 3:
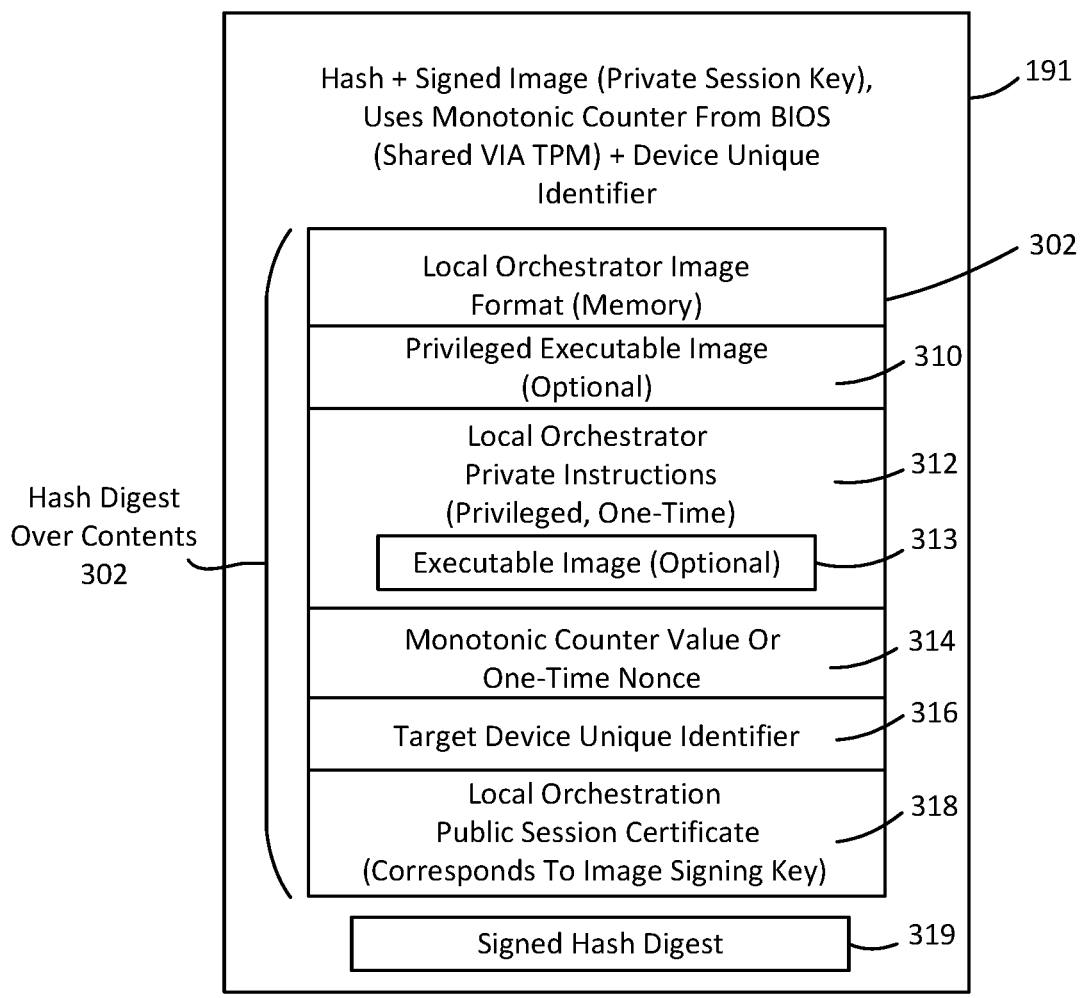
FIG. 3 illustrates a payload structure according to one exemplary embodiment of the disclosed systems and methods.

In one embodiment of block 207, BIOS instructions 312 of block 207 may optionally include a privileged executable image 313, i.e., in addition to or as an alternative to a separate privileged executable image 310 that may be optionally downloaded as shown in FIG. 3. In on embodiment, at least one of an executable image 310 or an executable image 313 is downloaded in block 207 with BIOS instructions 312. In block 207, local orchestrator logic 107 may also optionally verify the downloaded instructions and executable image/s using a public key (e.g., corresponding to the OEM or other authorized software provider) that may be optionally obtained in one embodiment from an OEM (or other authorized software provider) signing certificate.

Next, in block 208, local orchestrator logic 107 sets up an ephemeral session secret by creating an ephemeral (i.e., temporary) public/private orchestration "session" key pair 109 inside the Container/MLE 105. In block 210, local orchestrator 107 sends the created orchestration session public key across network 163 with other information (e.g., signature) verifying the trustworthiness and authenticity of the current container/MLE 105 in a certificate signing request (CSR) to certificate authority server 147 to request authorization to use this public key for the current orchestration "session" on the specific information handling system 100, with a requested orchestration session time duration (e.g., orchestration session validity period) that is long enough to complete the privileged action identified in block 207 (e.g., less than 24 hours, or less than any other designated greater or lesser time period).

In block 212, the certificate authority logic 143 executing on programmable integrated circuit 150 of certificate authority server 147 receives the CSR with the orchestration session public key across network 163 from local orchestrator logic 107 executing on information handling system 100. In block 212, certificate authority server 147 includes the orchestration "session" public key received from local orchestrator 107 within a signed "session" certificate 193 (corresponding to an image-signing private key) across network 163 to local orchestrator 107 executing on information handling system 100.

In one optional embodiment of block 212, certificate authority logic 143 executing on certificate authority server 147 may first verify that the requested orchestration session time duration received from local orchestrator 107 in block 210 is less than or equal to a predesignated maximum session time threshold for the privileged action identified in block 207 as a precondition for signing the "session" certificate 193 that includes the "session" public key. In this regard, a predesignated maximum session time threshold for privileged action may be selected, for example, to be equal to a period of time that meets expectations by being reasonably short, but long enough to complete the privileged action. In the event that certificate authority logic 143 finds that the requested orchestration session time duration exceeds the predesignated maximum session time threshold for the privileged action identified in block 207, then in this embodiment certificate authority logic 143 will decline to sign and provide the signed orchestration "session" certificate 193 with the orchestration "session" public key to local orchestrator logic 107 executing on information handling system 100. In such an optional case, local orchestrator logic 107 may respond to non-receipt of the signed orchestration "session" certificate 193 (with orchestration "session" public key) by proceeding directly to block 218 of methodology 200, without performing the actions of the intervening blocks 214 and 216 (described further below).

Next, in block 214, local orchestrator logic 107 responds to receipt of the signed orchestration "session" certificate 193 (that includes the orchestration "session" public key) from certificate authority server 147 by creating and signing orchestration instruction payload structure 191 using the ephemeral private session key of block 208. To create the orchestration instruction payload structure 191 in block 214, local orchestrator logic 107 may compile or customize a set of privileged instructions (e.g., for the privileged executable image/s downloaded in block 207) for BIOS 194 to execute to accomplish the specific identified custom privileged action identified in block 207. Examples of such privileged executable images include, but are not limited to, an operating system image (e.g., secure boot Windows operating system, regular Windows operating system, Linux operating system, etc.) that is downloaded to follow the set of privileged instructions of block 214 to perform the identified custom privileged action of block 207.

In block 214, local orchestrator logic 107 may execute in one embodiment to access, retrieve and use a current monotonic count value of shared monotonic counter 137 (i.e., accessible and available to both local orchestrator logic 107 and to BIOS 194) to create orchestration instruction payload structure 191. In one embodiment, shared monotonic counter 137 may be a replay-protected monotonic counter (RPMC) that is incremented at each use or otherwise at will, and that is used by local orchestrator logic 107 each time step 214 is executed, and that is stored and maintained in TPM 133 (as shown) or alternatively in another suitable location such as SPI flash memory of NVM 190. In another embodiment, shared monotonic counter 137 may be a monotonic boot counter that is incremented at each system boot on TPM 133 and that is retrieved and used by local orchestrator logic 107 in block 214. In one embodiment, the current monotonic counter value of block 214 may be different from any other monotonic counter value previously retrieved by (or provided to) local orchestrator logic 107.

Still referring to block 214, local orchestrator logic 107 may append the retrieved current monotonic count value (e.g., from monotonic counter 137) and some selected target system/device identifying information (e.g., target device unique identifier) that is unique to information handling system 100 (e.g., such as system serial number, system service tag, system asset tag, embedded controller unique identifier (EC UID), etc.) to the customized or compiled privileged instructions of block 214, along with the instructions and optional privileged executable image/s downloaded in block 207, to create payload contents 302 as shown in FIG. 3. Local orchestrator 107 may then hash the payload contents 302, and sign (encrypt) the resulting (original) hash digest 319 with the ephemeral private session key (corresponding to the public session certificate 318) of block 208. The hash digest 319 is then stored with payload contents 302 in signed orchestration instruction payload structure 191, an example of which is illustrated in FIG. 3. The hash value of the payload contents 302 may be calculated, for example, using a cryptographic hashing algorithm such as a SHA-2 algorithm (e.g., SHA-256, SHA-284, SHA-512; SHA-3 algorithm, etc.), or any other suitable cryptographic hashing algorithm).

In an alternate embodiment, a nonce (e.g., a one-time use random number or other one-time use unique number or value) may be provided in a confidential, integrity-protected, and replay-protected manner by BIOS 194 to local orchestrator logic 107 that is executing within container (e.g., TXT MLE) 105. In one implementation of this alternate embodiment, the provided current nonce may be unique and different from any other nonce previously provided to (or retrieved by) local orchestrator logic 107. In any case, this nonce may be substituted in block 214 for the current monotonic count value, and appended to the target system/device identifying information, customized or compiled privileged instructions, and optional separate privileged executable image downloaded in block 207 together with the hash digest 319 of block 214, which is then signed with the ephemeral private session key of block 208 to create signed orchestration instruction payload structure 191.

Next, in block 216, local orchestrator logic 107 executes to store signed orchestration instruction payload structure 191 and signed orchestration "session" certificate 193 in a public memory location (i.e., outside container/MLE 105) on information handling system 100 that can later be discovered by the BIOS 194 in the methodology of FIG. 4 herein, i.e., discovered by BIOS 194 after rebooting, along with the signed orchestration "session" certificate 193 provided in block 212 by certificate authority server 147. It will be understood that signed orchestration instruction payload structure 191 and signed orchestration "session" certificate 193 may be stored in any memory location that is local to or remote from information handling system 100, and that is later accessible by BIOS 194, e.g., such as system volatile memory 120 (if not erased by Container exit, or TXT SEXIT, or TXT reset memory clear), system non-volatile memory 190 (as shown in embodiment of FIG. 2), non-volatile memory of system storage 160, unified extensible firmware interface "UEFI" Variables, etc.

In one embodiment, portions of system volatile memory 120 (e.g., random access memory "RAM") that is outside the private memory space (or private RAM space) of containerized computing environment 105 may be used to store signed orchestration instruction payload structure 191 and signed orchestration "session" certificate 193. In such an embodiment, portions of volatile system memory 120 that are used to store private memory or private RAM space of containerized computing environment 105 may be erased on exit from containerized computing environment 105, while other portion/s of volatile system memory 120 that contain signed orchestration instruction payload structure 191 and signed orchestration "session" certificate 193 may be maintained (and not erased) on exit from containerized computing environment 105. In such an embodiment, signed orchestration instruction payload structure 191 and signed orchestration "session" certificate 193 may be retrieved upon reboot of BIOS 194 (e.g., such as a soft reboot from BIOS 194 in block 220 of FIGS. 2 and 4).

Next, in block 218, local orchestrator logic 107 erases or otherwise destroys ephemeral private session key (and optionally also the public session key) of block 208 from system memory in which it is currently stored (e.g., from system non-volatile memory 190, from system volatile memory 120, etc.) and exits the container 105 (as well as the current containerized computing environment) without executing the instructions 312 and the at least one executable image 310 and/or 313. It will be understood that erasure of the ephemeral private session key is also guaranteed by exiting the containerized computing environment (e.g., MLE), or by an unexpected reset (i.e., which would trigger TXT MLE memory erasure upon reboot). After block 218, methodology 200 proceeds to block 220, where system BIOS 194 reboots into an alternate and different computing environment from the containerized computing environment described in blocks 202 to 218. In one exemplary embodiment, system BIOS 194 may automatically reboot upon completion of block 218.

FIG. 3 illustrates one exemplary embodiment of signed orchestration instruction payload structure 191 including orchestration instructions, it being understood that in other embodiments a signed orchestration instruction payload structure 191 may include additional, fewer and/or alternative components to those illustrated in FIG. 3.

Still referring to FIG. 3, signed orchestration instruction payload structure 191 of block 216 includes both the image and signature of the image. In this regard, signed orchestration instruction payload structure 191 is signed by an ephemeral orchestration private key and stored in a public memory location on information handling system 100, and includes payload contents 302 (which includes both image and signature). In this embodiment, payload contents 302 of signed orchestration instruction payload structure 191 includes local orchestrator one-time private BIOS instructions (e.g., privileged, one-time instructions) 312, at least one of privileged executable image 310 and/or privileged executable image 313, monotonic counter value 314, target device (e.g., information handling system 100) unique device identifier 316, and local orchestration public session certificate 318. As shown, payload structure 191 also includes signed hash digest 319 (created in block 214) that is stored together with the payload contents 302. In this embodiment, the signed hash digest 318 is a digest of a hash over the entire payload contents 302. It will be understood that in some embodiments, instructions 312 may be present with a separate privileged executable image 310, and with no privileged executable image 313 present within instructions 312. In other embodiments, it is possible that BIOS instructions 312 may be present without separate instructions 310, and with a privileged executable image 313 included within instructions 312.

Figure 4:
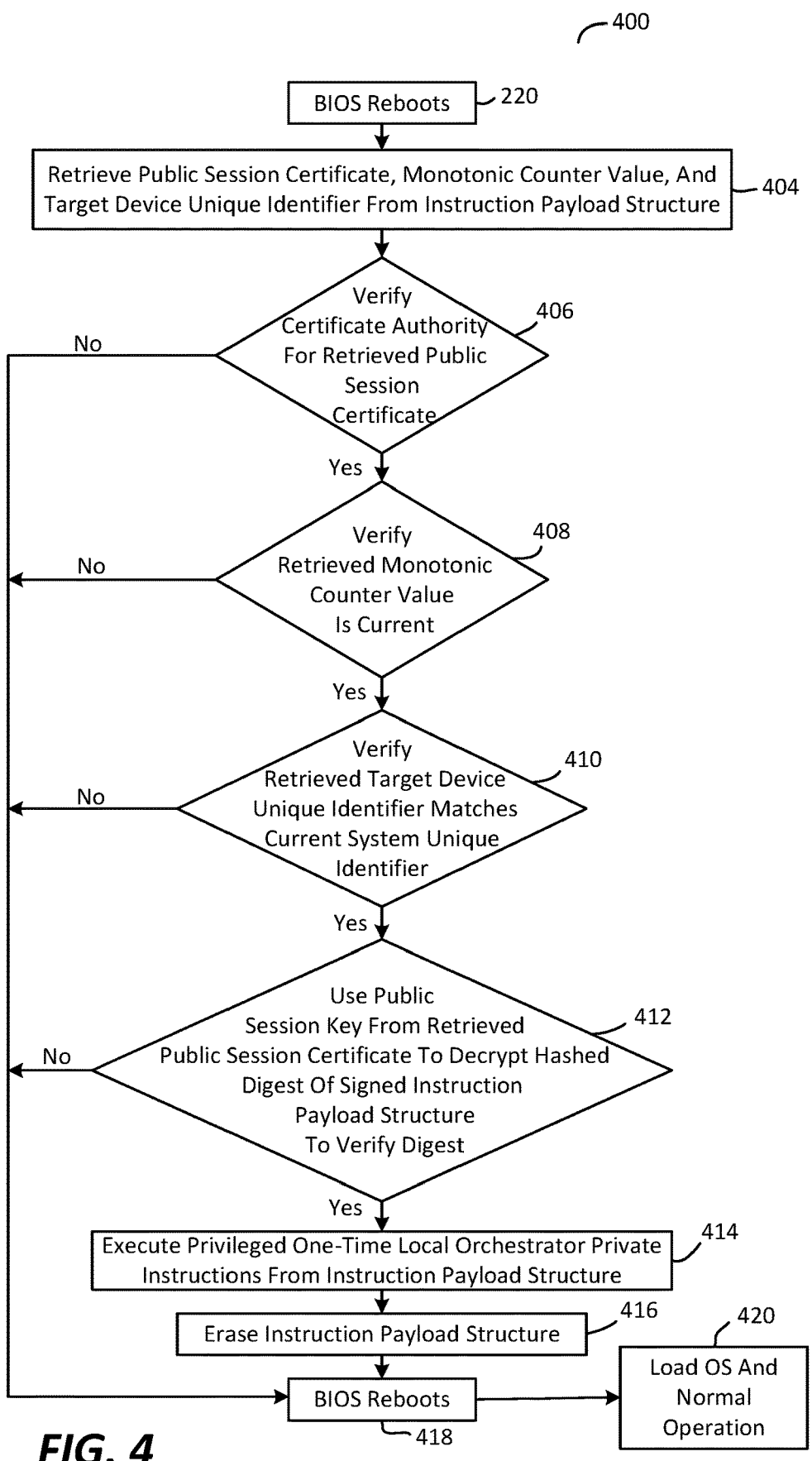
FIG. 4 illustrates methodology according to one exemplary embodiment of the disclosed systems and methods.

FIG. 4 illustrates one exemplary embodiment of a methodology 400 that may be implemented on information handling system 100 following completion of methodology 200 of FIG. 2. As shown, methodology 400 begins with block 220 previously described in relation to methodology 200 of FIG. 2, with BIOS 194 rebooting to an alternate and different computing environment that is outside (and different from) the containerized computing environment and container 105 described in blocks 202 to 218. This rebooting may occur at a restart of information handling system 100, power off and power on cycle of information handling system 100, etc. Methodology 400 then proceeds to blocks 404 to 420 as described below.

In block 404, BIOS 194 discovers the signed orchestration instruction payload structure 191 stored with signed orchestration "session" certificate 193 in NVM 190, and decomposes this discovered information from the signed orchestration instruction payload structure 191 to retrieve the orchestration public "session" certificate 193, the monotonic counter value 314 (or the nonce in an alternative embodiment previously described), and the target device unique identifier 316 for information handling system 100.

In block 406, BIOS 194 begins verifies the validity of the signed orchestration "session" certificate 193 by confirming that the session time period specified by the session certificate 193 is current (and not expired), and by confirming that the signing authority for the certificate corresponds to the authorized certificate authority of server 147. In block 406, BIOS 194 further verifies the certificate authority matches valid certificate authority information previously stored in a local trust store (e.g., pinned certificate 198 of BIOS 194). If at least one of: 1) the session time period of session certificate 193 has expired, 2) the signing authority does not correspond to the authorized signing authority, and/or 3) the certificate authority does not match the valid certificate authority information stored in the local trust store, then verification of block 406 fails. In an optional embodiment where network 163 (e.g., the Internet or a corporate intranet) is available, BIOS 194 BIOS may additionally or alternatively query the signing authority (e.g., certificate authority server 147) across network 163 to confirm that the signed orchestration "session" certificate 193 is not included in any pending or updated Certificate Revocation Lists (CRL's). If the signed orchestration "session" certificate 193 is found to be included in any pending or updated CRL, the verification of block 406 fails.

Otherwise, if the verification of block 406 passes, then methodology 400 proceeds to block 408 where BIOS 194 retrieves the monotonic counter value 314 (or nonce in the alternative embodiment) from signed orchestration instruction payload structure 191, and verifies the freshness/recentness of the retrieved monotonic counter value 314 (or nonce) by confirming that it matches the current monotonic counter value (or nonce) maintained on information handling system 100. In this regard, a current monotonic boot counter value 137 may be retrieved from TPM 133, and a current RPMC value may be retrieved from the location where it is maintained on information handling system (e.g., TPM 133 or NVM 190). Also, at this time in block 406, BIOS 194 may optionally increment the current monotonic counter value maintained on information handling system 100 to avoid future reuse or replay. In the alternative embodiment of a nonce, BIOS 194 retrieves the nonce from signed orchestration instruction payload structure 191 and compares it to a previously-provided nonce that was previously and separately stored on information handling system 100 (e.g., in TPM 133 or NVM 190) to ensure that the retrieved nonce from signed orchestration instruction payload structure 191 matches the previously-provided nonce (and may optionally clear the previously-provided nonce value to prevent future reuse or replay). If the retrieved monotonic counter value 314 (or nonce) from signed orchestration instruction payload structure 191 is found not to match the corresponding separate current value maintained on information handling system 100, then verification of block 408 fails.

Otherwise, if the verification of block 408 passes, then methodology 400 proceeds to block 410 where BIOS 194 verifies that the retrieved target device unique identifier 316 from signed orchestration instruction payload structure 191 matches the current system context, i.e., matches the corresponding unique identifier of the current information handling system 100 (e.g., such as may be previously and separately stored in BIOS 194). If the retrieved target device unique identifier 316 from signed orchestration instruction payload structure 191 is found not to match the corresponding unique identifier of the current information handling system 100, then the current information handling system 100 is not the intended system for the signed orchestration instruction payload structure 191 and the verification of block 410 fails.

Otherwise, if the verification of block 410 passes (i.e., the current information handling system 100 is the intended system for the signed orchestration instruction payload structure 191), then methodology 400 proceeds to block 412 where BIOS 194 uses the session public key retrieved from the signed orchestration "session" certificate 193 to decrypt the signed (original) hashed digest 319 of the decomposed signed payload instruction structure 191. BIOS 194 verifies that this decryption is successful by separately calculating its own (new) hash digest over the entire payload contents 302, and then comparing this separate and newly-calculated hash digest to the decrypted original hash digest 319 included in payload structure 191. In block 410, the separate and newly-calculated hash digest must be found to be the same as (i.e., match) the original decrypted hash digest 319 for successful verification to occur in block 410. Further information on hashing and verification of hashed values may be found described, for example, in U.S. patent application Ser. No. 17/458,088 filed Aug. 26, 2021, which is incorporated herein by reference in its entirety for all purposes.

Upon failure of the verification of any of blocks 406, 408, 410 or 412, then methodology 400 proceeds directly to blocks 418 and 420 described below, i.e., without performing any of the intervening blocks of methodology 400.

However, if the verifications of all blocks 406, 408, 410 and 412 pass, then the data image of signed orchestration instruction payload structure 191 is verified, and methodology 400 proceeds to block 414 where BIOS 194 executes (e.g., using Secure Boot verification) the privileged one-time BIOS instructions 312 and at least one of executable image/s 310 and/or 313 retrieved from signed orchestration instruction payload structure 191 to perform one or more privileged and/or sensitive actions on information handling system 100. Examples of such privileged and/or sensitive actions include, but are not limited to, system hardware and/or software diagnostics, system memory scanning, booting to another and separate computing environment and/or operating system other than system OS 101, BIOS attribute changes, change or creation of specific layout of OS images in RamDisk format, booting to system OS 101 to run a privileged (e.g., non-normal) operation, etc.

After completion of the execution of the privileged one-time instructions 312 and executable image/s 310 and/or 313 in block 414, then methodology proceeds to block 416, where BIOS 194 erases the signed orchestration instruction payload structure 191 and signed orchestration "session" certificate 193 from NVM 190 (or alternative public storage location if that is used), and methodology 400 proceeds to block 418 where BIOS 194 reboots, and then proceeds to block 420 where the system OS 101 is loaded and normal system operation resumes on information handling system 100.

It will be understood that the particular combination of blocks of methodologies 200 and 400 are exemplary only, and that other combinations and/or order of additional, fewer, and/or alternative blocks may be employed that are suitable for installing, authenticating and/or then executing one-time unique instructions that are previously left behind (i.e., stored) in public memory of an information handling system by a containerized computing environment session that is no longer executing on the information handling system.

It will also be understood that one or more of the tasks, functions, or methodologies described herein (e.g., including those described herein for components 101, 102, 103, 105, 107, 109, 110, 133, 137, 143, 147, 150, 153, 158, 159, 171, 175, 180, 191, 194, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more blocks of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more blocks of the present methodologies may be employed in one or more code segments of the computer program. For example, a code segment executed by the information handling system may include one or more blocks of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
   executing a secure containerized computing environment on a first information handling system to each of access, load, and then execute an ephemeral operating system (OS) or software to perform the following:
   create a data payload structure within the secure containerized computing environment, the data payload structure comprising payload contents that include software or firmware instructions and at least one executable image that is executable to perform at least one specific custom privileged action and that has a set of custom privileges that allow the performance of the at least one specific custom privileged action such that the custom privileged action is not allowable on the first information handling system without the set of custom privileges, and
   then store the data payload structure in a public memory of the first information handling system; and
   then exiting the secure containerized computing environment on the first information handling system without executing the software or firmware instructions and the at least one executable image.

2. The method of claim 1, where the software or firmware instructions comprise software or firmware instructions for a system basic input/output system (BIOS) on how to execute an executable code of the at least one executable image to perform the at least one specific custom privileged action.

3. The method of claim 1, where the method further comprises:
   executing the secure containerized computing environment on the first information handling system to perform the following prior to creating the data payload structure within the secure containerized computing environment:
   create a temporary pair of a session public key and a session private key and send the created session public key together with a request for a session certificate and a requested session time duration to a different and remote information handling system, the session public key with the request for a session certificate and the requested time duration being sent together across a network from the first information handling system to the different and remote information handling system, and the requested session time duration specifying less than a designated time period to complete the at least one specific custom privileged action, and
   receive, in response to the request for the session certificate, a signed version of the session certificate including the session public key, the signed version of the session certificate including the session public key being received from across the network by the first information handling system from the remote information handling system; and
   then executing the secure containerized computing environment on the first information handling system to:
   perform the creation of the data payload structure within the secure containerized computing environment such that the payload contents of the data payload structure further comprise the signed session certificate together with the at least one executable image and the software or firmware instructions;
   then sign the data payload structure with the session private key prior to performing the storage of the data payload structure in the public memory of the first information handling system such that the data payload structure is a signed data payload structure and such that the signed data payload structure is stored in the public memory of the first information handling system.

4. The method of claim 3, where the request for the session certificate specifies a requested session time duration; and where the method further comprises:
   receiving, across the network in the remote information handling system, the session public key in the request for the session certificate; and
   then responding to the receipt of the session public key in the request for the session certificate in the remote information handling system by performing the following:
   creating the session certificate to include the session public key and to be valid for the requested session time duration,
   signing the session certificate, and
   sending the signed session certificate with the session public key across the network from the remote information handling system to the first information handling system.

5. The method of claim 3, where the request for the session certificate specifies a requested session time duration; and where the method further comprises:

receiving, across the network in the remote information handling system, the session public key and the request for the session certificate; and then responding to the receipt of the session public key and the session certificate in the remote information handling system by performing the following:

determining if the requested session time duration exceeds a predesignated maximum session time threshold, and then, only if the requested session time duration does not exceed the predesignated maximum session time threshold, performing the following:

creating the session certificate to include the session public key and to be valid for the requested session time duration, signing the session certificate, and sending the signed session certificate with the session public key across the network from the remote information handling system to the first information handling system.

6. The method of claim 3, where the different and remote information handling system is a certificate authority server, and where the request for a session certificate is a certificate signing request (CSR).

7. The method of claim 1, where the method further comprises:

executing the secure containerized computing environment on the first information handling system to at least one of:

retrieve a one-time current nonce created on the first information handling system, the current nonce being unique and different from any other nonce previously retrieved by the secure containerized computing environment, or retrieve an existing monotonic counter value from a trusted platform module (TPM) of the first information handling system, the monotonic counter value being incremented to be a current monotonic counter value at each system boot or at each retrieval of the monotonic counter value by the secure containerized computing environment so that the current monotonic counter value is different from any other monotonic counter value previously retrieved by the secure containerized computing environment; and then executing the secure containerized computing environment on the first information handling system to perform the creation of the payload contents of the data payload structure to further comprise the at least one of the current monotonic counter value or the current one-time nonce, together with the at least one executable image and the software or firmware instructions.

8. The method of claim 1, where the method further comprises executing the secure containerized computing environment on the first information handling system to:

retrieve identifying information for the first information handling system, the retrieved identifying information being unique to the first information handling system; and then perform the creation of the payload contents of the data payload structure to further comprise the retrieved identifying information, together with the at least one executable image and the software or firmware instructions.

9. The method of claim 1, where the method further comprises executing the secure containerized computing environment on the first information handling system to:

hash the payload contents of the data payload structure to create a hash digest;

sign the hash digest with the temporary session private key; and then perform the creation of the data payload structure to further comprise the signed hashed digest together with the payload contents.

10. The method of claim 1, where the software or firmware instructions are one-time unique execution instructions that are usable only one time to perform the at least one specific custom privileged action.

11. The method of claim 1, where, in addition to the at least one executable image and the software or firmware instructions, the payload contents of the data payload structure further comprise identifying information unique to the first information handling system, a signed session certificate, and at least one of a monotonic counter value or a unique one-time nonce; and where the data payload structure further comprises an original hash digest created by the secure containerized computing environment from a hash of the payload contents.

12. The method of claim 11, further comprising performing the following after exiting the secure containerized computing environment on the first information handling system:

booting a system basic input/output system (BIOS) to a computing environment on the first information handling system that is outside and different from the secure containerized computing environment;

executing the booted system BIOS to:

retrieve data from the payload contents of the data payload structure, the retrieved data from the payload contents comprising the at least one executable image, the software or firmware instructions, the identifying information unique to the first information handling system, the signed session certificate, and at least one of the monotonic counter value or the unique one-time nonce, retrieve and decrypt the hash digest from the data payload structure using a session public key obtained from the retrieved signed session certificate, and separately create a new hash digest from a hash of the retrieved data from the payload contents of the data payload structure;

executing the booted system BIOS to perform each of the following verification actions to verify the following retrieved data from the data payload structure without existence of a direct line of communication between the booted system BIOS and the previous and now closed session of the secure containerized computing environment, in order (a) to verify that the previously-stored software or firmware instructions in the data payload structure have not been altered after the storage of the software or firmware instructions by the secure containerized computing environment, and (b) to limit a set of custom privileges of the at least one executable image such that the set only includes a set of custom privileges previously created in the payload contents of the data payload structure by the secure containerized computing environment on the first information handling system:

verifying a validity of the retrieved signed session certificate by confirming that a duration of a session time period specified by the signed session certificate is current and not expired and by confirming that a signing authority of the signed session certificate is an authorized certificate authority of a server that matches valid certificate authority identity information previously stored on a nonvolatile memory of the first information handling system, verifying that the at least one of the retrieved monotonic counter value or nonce matches a respective corresponding monotonic counter value or nonce that is at least one of separately maintained or separately created on the first information handling system, verifying that the retrieved identifying information unique to the first information handling system matches identifying information that is previously stored on a nonvolatile memory of the first information handling system, and verifying a validity of the original hash digest by confirming that the separately-created new hash digest matches the decrypted original hash digest;

then, only if each of the verification actions successfully verifies its corresponding retrieved data from the data payload structure, executing the retrieved software or firmware instructions and the retrieved at least one executable image to perform one or more actions on the first information handling system that are specified by the retrieved software or firmware instructions; and then erasing the data payload structure from the public memory of the first information handling system.

13. The method of claim 12, where the one or more actions specified by the retrieved software or firmware instructions comprise at least one of system hardware diagnostics, system software diagnostics, system memory scanning, booting to another and separate computing environment, booting to another and separate operating system, changes to BIOS attributes, creation or changes to a specific layout of operating system images, or booting to a system operating system on the first information handling system to run the at least one specific custom privileged action as a privileged operation.

14. The method of claim 1, further comprising performing the following after exiting the secure containerized computing environment on the first information handling system:

booting a system basic input/output system (BIOS) to a computing environment on the first information handling system that is outside and different from the secure containerized computing environment;

executing the booted system BIOS to retrieve each of the software or firmware instructions and the at least one executable image from the payload contents of the data payload structure;

then executing the retrieved software or firmware instructions and the retrieved at least one executable image to perform one or more actions on the first information handling system that are specified by the retrieved software or firmware instructions; and then erasing the data payload structure from the public memory of the first information handling system.

15. The method of claim 1, further comprising performing the following after exiting the secure containerized computing environment on the first information handling system:

booting a system basic input/output system (BIOS) to a computing environment on the first information handling system that is outside and different from the exited secure containerized computing environment on the first information handling system;

executing the booted system BIOS to retrieve each of the software or firmware instructions and the at least one executable image from the payload contents of the data payload structure previously stored in the public memory of the first information handling system during the previously-executed secure containerized computing environment; and then executing the retrieved software or firmware instructions and the retrieved at least one executable image to perform one or more actions on the information handling system that are specified by the retrieved software or firmware instructions.

16. The method of claim 1, where the at least one specific custom privileged action comprises at least one of performing system hardware diagnostics, performing system software diagnostics, performing system memory scanning, performing booting to another and separate computing environment or operating system, performing system basic input/output system (BIOS) attribute changes, performing a change of a specific layout of OS images in RamDisk format, performing a creation of the specific layout of OS images in RamDisk format, or performing booting to system OS to run the at least one specific custom privileged action as a privileged operation.

17. The method of claim 1, where the at least one specific custom privileged action comprises each of performing system hardware diagnostics, performing system software diagnostics, performing system memory scanning, performing booting to another and separate computing environment or operating system, performing system basic input/output system (BIOS) attribute changes, performing a change er of a specific layout of OS images in RamDisk format, performing a creation of the specific layout of OS images in RamDisk format, and performing booting to system OS to run the at least one specific custom privileged action as a privileged operation.

18. The method of claim 1, further comprising:

booting a system basic input/output system (BIOS) a first time to the secure containerized computing environment on the first information handling system;

then, after exiting the secure containerized computing environment, booting the system BIOS a second time to a computing environment on the first information handling system that is outside and different from the containerized computing environment; and then executing the booted system BIOS of the second boot time to:

retrieve data from the payload contents of the data payload structure, the retrieved data from the payload contents comprising the at least one executable image, the software or firmware instructions, the identifying information unique to the first information handling system, the signed session certificate, and at least one of the monotonic counter value or the unique one-time nonce, retrieve and decrypt the hash digest from the data payload structure using a session public key obtained from the retrieved signed session certificate, and separately create a new hash digest from a hash of the retrieved data from the payload contents of the data payload structure;

executing the booted system BIOS to perform each of the following verification actions to verify the following retrieved data from the data payload structure:

verifying a validity of the retrieved signed session certificate by confirming that a duration of a session time period specified by the signed session certificate is current and not expired and by confirming that a signing authority of the signed session certificate is an authorized certificate authority of a server that matches valid certificate authority identity information previously stored on a nonvolatile memory of the first information handling system, verifying that the at least one of the retrieved monotonic counter value or nonce matches a respective corresponding monotonic counter value or nonce that is at least one of separately maintained or separately created on the first information handling system, verifying that the retrieved identifying information unique to the first information handling system matches identifying information that is previously stored on a nonvolatile memory of the first information handling system, and verifying a validity of the original hash digest by confirming that the separately-created new hash digest matches the decrypted original hash digest;

then, only if each of the verification actions successfully verifies its corresponding retrieved data from the data payload structure, executing the retrieved software or firmware instructions and the retrieved at least one executable image to perform one or more actions on the first information handling system that are specified by the retrieved software or firmware instructions; and then erasing the data payload structure from the public memory of the first information handling system.

19. A system, comprising a first information handling system comprising at least one programmable integrated circuit programmed to:

execute a secure containerized computing environment on a first information handling system to each of access, load, and then execute an ephemeral operating system (OS) or software to perform the following:

create a data payload structure within the secure containerized computing environment, the data payload structure comprising payload contents that include software or firmware instructions and at least one executable image that is executable to perform at least one specific custom privileged action and that has a set of custom privileges that allow the performance of the at least one specific identified custom privileged action that such that the custom privileged action is not allowable on the first information handling system without the set of custom privileges, and then store the data payload structure in a public memory of the first information handling system; and then exit the secure containerized computing environment on the first information handling system without executing the software or firmware instructions and the at least one executable image.

20. The system of claim 19, where the software or firmware instructions comprise software or firmware instructions for a system basic input/output system (BIOS) on how to execute an executable code of the at least one executable image to perform the at least one specific custom privileged action; and where the at least one programmable integrated circuit is programmed to:

execute the secure containerized computing environment on the first information handling system to perform the following prior to creating the data payload structure within the secure containerized computing environment:

create a temporary pair of a session public key and a session private key and send the created session public key together with a request for a session certificate and a requested session time duration from the first information handling system to a different and remote information handling system, the session public key with the request for a session certificate and the requested session time duration being sent together across a network from the first information handling system to the different and remote information handling system, and the requested session time duration specifying less than a designated time period to complete the at least one specific custom privileged action, and receive, in response to the request for the session certificate, a signed version of the session certificate including the session public key, the signed version of the session certificate including the session public key being received in the first information handling system from across the network from the remote information handling system; and then execute the secure containerized computing environment on the first information handling system to:

perform the creation of the payload contents of the data payload structure to further comprise the signed session certificate together with the at least one executable image and the software or firmware instructions;

then sign the data payload structure with the session private key prior to performing the storage of the data payload structure in the public memory of the first information handling system such that the data payload structure is a signed data payload structure and such that the signed data payload structure is stored in the public memory of the information handling system.

21. The system of claim 20, further comprising the remote information handling system; where the request for the session certificate specifies a requested session time duration; and where at least one programmable integrated circuit of the remote information handling system is programmed to:

receive, across the network in the remote information handling system, the session public key in the request for the session certificate; and then respond to the receipt of the session public key in the request for the session certificate in the remote information handling system by performing the following:

creating the session certificate to include the session public key and to be valid for the requested session time duration, signing the session certificate, and sending the signed session certificate with the session public key across the network from the remote information handling system to the first information handling system.

22. The system of claim 19, where the at least one programmable integrated circuit is programmed to:

retrieve at least one of:

a one-time current nonce created on the first information handling system, the current nonce being unique and different from any other nonce previously retrieved by the secure containerized computing environment, or an existing monotonic counter value from a trusted platform module (TPM) of the first information handling system, the monotonic counter value being incremented to be a current monotonic counter value at each system boot or at each retrieval of the monotonic counter value by the secure containerized computing environment so that the current monotonic counter value is different from any other monotonic counter value previously retrieved by the secure containerized computing environment; and then perform the creation of the payload contents of the data payload structure within the secure containerized computing environment to further comprise the at least one of the current monotonic counter value or the current one-time nonce, together with the at least one executable image and the software or firmware instructions.

23. The system of claim 19, where the at least one specific custom privileged action comprises a one-time privileged action; where the software or firmware instructions comprise execution instructions to perform the one-time privileged action; where, in addition to the at least one executable image and the software or firmware instructions, the payload contents of the data payload structure stored in the memory of the first information handling system further comprises identifying information unique to the first information handling system, a signed session certificate, and at least one of a monotonic counter value or a unique one- time nonce; and where the data payload structure further comprises an original hash digest created by the secure containerized computing environment from a hash of the payload content.

24. The system of claim 23, where the at least one programmable integrated circuit is programmed to perform the following after exiting the secure containerized computing environment on the first information handling system:

boot a system basic input/output system (BIOS) to a computing environment on the first information handling system that is outside and different from the secure containerized computing environment;

execute the booted system BIOS to:

retrieve data from the payload contents of the data payload structure, the retrieved data from the payload contents comprising the at least one executable image, the software or firmware instructions, the identifying information unique to the first information handling system, the signed session certificate, and at least one of the monotonic counter value or the unique one-time nonce, retrieve and decrypt the hash digest from the data payload structure using a session public key obtained from the retrieved signed session certificate, and separately create a new hash digest from a hash of the retrieved data from the payload contents of the data payload structure;

executing the booted system BIOS to perform each of the following verification actions to verify the following retrieved data from the data payload structure without existence of a direct line of communication between the booted system BIOS and the previous and now closed session of the secure containerized computing environment, in order (a) to verify that the previously-stored software or firmware instructions in the data payload structure have not been altered after the storage of the software or firmware instructions by the secure containerized computing environment, and (b) to limit a set of custom privileges of the at least one executable image such that the set only includes a set of custom privileges previously created in the payload contents of the data payload structure by the secure containerized computing environment on the first information handling system:

verifying a validity of the retrieved signed session certificate by confirming that a duration of a session time period specified by the signed session certificate is current and not expired and by confirming that a signing authority of the signed session certificate is an authorized certificate authority of a server that matches valid certificate authority identity information previously stored on a nonvolatile memory of the first information handling system, verifying that the at least one of the retrieved monotonic counter value or nonce matches a respective corresponding monotonic counter value or nonce that is at least one of separately maintained or separately created on the first information handling system, verifying that the retrieved identifying information unique to the first information handling system matches identifying information that is previously stored on a nonvolatile memory of the first information handling system, and verifying a validity of the original hash digest by confirming that the separately-created new hash digest matches the decrypted original hash digest;

then, only if each of the verification actions successfully verifies its corresponding retrieved data from the data payload structure, execute the retrieved software or firmware instructions and the retrieved at least one executable image to perform one or more actions on the first information handling system that are specified by the retrieved software or firmware instructions; and then erase the data payload structure from the public memory of the first information handling system.

25. The system of claim 19, where the at least one programmable integrated circuit is programmed to perform the following after exiting the secure containerized computing environment on the first information handling system:

boot a system basic input/output system (BIOS) to a computing environment on the first information handling system that is outside and different from the secure containerized computing environment;

execute the booted system BIOS to retrieve each of the at least one executable image and the software or firmware instructions from the payload contents of the data payload structure;

then execute the retrieved software or firmware instructions and the retrieved at least one executable image to perform one or more actions on the first information handling system that are specified by the retrieved software or firmware instructions; and then erase the data payload structure from the public memory of the first information handling system.

* * * * *